United States Patent [19]
Adams

[11] Patent Number: 5,069,301
[45] Date of Patent: Dec. 3, 1991

[54] VEHICLE POWER ASSISTED STEERING SYSTEM

[75] Inventor: Frederick J. Adams, Clevedon, Great Britain

[73] Assignee: TRW Cam Gears Limited, Clevedon, Great Britain

[21] Appl. No.: 524,128

[22] Filed: May 14, 1990

[30] Foreign Application Priority Data

Jun. 23, 1989 [GB] United Kingdom ............... 8914514

[51] Int. Cl.$^5$ .............................................. B62D 5/08
[52] U.S. Cl. .................................. 180/143; 137/501; 137/504; 137/596.12; 180/149
[58] Field of Search ...................... 180/143, 132, 149; 137/501, 504, 596.12

[56] References Cited

U.S. PATENT DOCUMENTS

| | | | |
|---|---|---|---|
| 3,485,638 | 12/1969 | Berta | 137/501 |
| 3,926,213 | 12/1975 | Carder | 137/504 |
| 4,410,059 | 10/1983 | Nakayama et al. | 180/143 |
| 4,434,866 | 3/1984 | Duffy | 180/143 |

FOREIGN PATENT DOCUMENTS

| | | | |
|---|---|---|---|
| 74169 | 3/1989 | Japan | 180/149 |
| 7900762 | 10/1979 | PCT Int'l Appl. | 180/143 |
| 2171371 | 8/1986 | United Kingdom | 180/143 |
| 2215684 | 9/1989 | United Kingdom | 180/149 |

*Primary Examiner*—Mitchell J. Hill
*Attorney, Agent, or Firm*—Tarolli, Sundheim & Covell

[57] ABSTRACT

A vehicle power assisted steering system comprises a hydraulic pump 24 having a constant volume output communicating with an open center power assistance valve 40 which is adjustable from a neutral condition in response to a steering input torque during a steering maneuver to control fluid flow from the pump to opposed chambers of a ram 18b providing power assistance to assist the steering maneuver. A by-pass valve 25 communicates between the outlet of the pump 24 and a fluid reservoir 21 and is responsive to vehicle speed to increasingly open communication between the pump 24 and the reservoir 21 as vehicle speed increases and conversely. The valve 40 has valve members displaceable from a neutral condition in response to a steering input torque to direct hydraulic fluid to actuate the ram 18b for power assistance. In the neutral condition of the valve members, they provide intercommunication between the pump 24, the chambers 18a of the ram and the reservoir 21. The valve members are biassed to the neutral condition. In order to prevent large fluid flows occurring during severe steering maneuvers at high speed, a flow sensitive valve 100 is provided in the line 28,29 connecting the pump 24 to the reservoir 21 by way of the by-pass valve 25 whereby the flow sensitive valve 100 acts to reduce the flow of fluid through the by-pass valve 25 when the flow of fluid reaches a predetermined maximum flow.

10 Claims, 4 Drawing Sheets

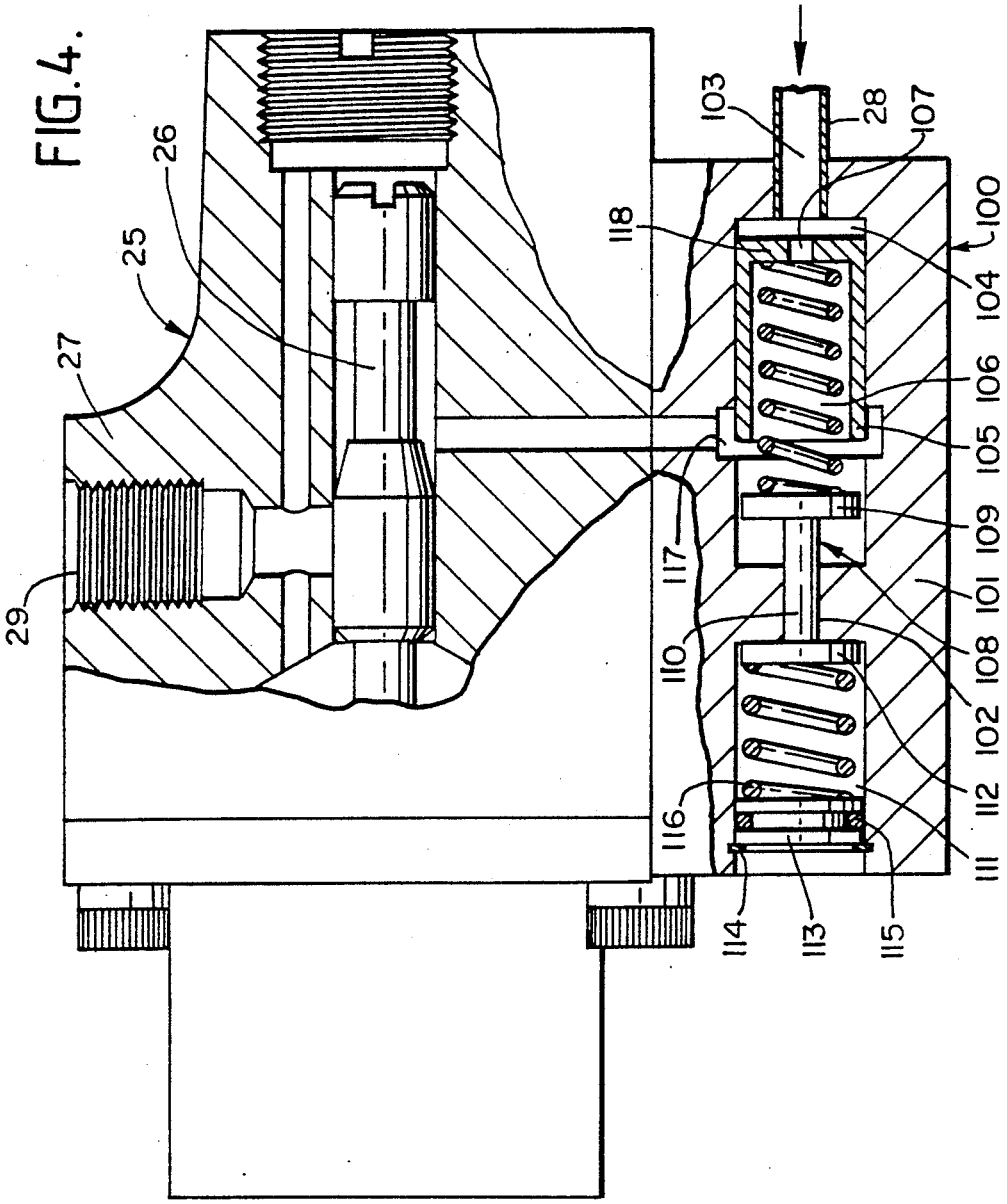

VEHICLE POWER ASSISTED STEERING SYSTEM

TECHNICAL FIELD AND BACKGROUND ART

The present invention relates to a vehicle power assisted steering system, more particularly to such a system of the type known as speed proportional whereby the power assistance which is provided decreases as vehicle speed increases and conversely. Systems of the aforementioned type are known as comprising an hydraulic pump having a constant volume output which communicates with an open centre power assistance valve that is adjustable from a neutral condition in response to a steering input torque during a steering maneuver to control fluid flow from the pump to opposed chambers of a ram which provides power assistance to assist the maneuver. The power assistance valve has valve members relative displacement (typically rotational displacement) between which from the neutral condition and in response to a steering input torque directs hydraulic fluid to actuate the ram for power assistance. In the neutral condition of the open center; power assistance valve, the valve members provide inter-communication between the pump, the chambers of the ram and the reservoir and these valve members are biased to the neutral condition by a biasing means. In the case of relatively rotational valve members the biasing means is usually either or both of a torsion rod or C-spring component which reacts between the valve members, for example in the manner disclosed in our British Patent Specification No. 2,165,502.

For the purpose of providing speed proportional power assisted steering with the system as discussed above, it has hitherto been proposed, for example in our British Patent Specification No. 1,293,192, to provide a bypass valve which communicates between the pump outlet and a fluid reservoir and which is responsive to vehicle speed so that the by-pass valve increasingly opens communication between the pump outlet and the reservoir as vehicle speed increases and conversely. By this arrangement the hydraulic fluid pressure differential between the pump outlet and the reservoir across the open center power assistance valve decreases as vehicle speed increases; therefore as vehicle speed increases there is an apparent decrease in fluid pressure available to actuate the power assistance ram and thereby the "feel" of the steering becomes heavier during a maneuver as the steering approaches what may be regarded as wholly manual steering characteristics. With such a speed proportional system, upon displacement of the open center power assistance valve from its neutral condition in response to a steering input torque, the opposed chambers of the ram are closed from communication with each other while the expanding chamber maintains its communication with the pump outlet and the contracting chamber maintains its communication with the reservoir in the known steering systems. It is recognised that this can have serious adverse consequences during normal steering of a vehicle at high speed where the by-pass valve is adjusted to a condition in which very little or no hydraulic pressure is available across the power assistance valve to assist in displacement of the ram. During this latter condition it is possible in some circumstances to allow too much fluid to be by-passed. This can occur if a severe and rapid steering maneuver is to be carried out at high vehicle speeds. This causes the system pressure to rise abnormally because the by-pass valve is fully open at these high vehicle speeds and the demanded pressure will cause large oil flows to be by-passed. The effect of this is that all power assistance is suddenly eliminated and this condition is not acceptable. It is an object of the present invention to provide a vehicle power assisted steering system of the speed proportional type and which alleviates the problem discussed above.

STATEMENT OF INVENTION AND ADVANTAGES

A vehicle power assisted steering system comprises an hydraulic pump having a constant volume output; an open center power assistance valve communicating with said output and which is adjustable from a neutral condition in response to a steering input torque during a steering maneuver to control fluid flow from the pump to opposed chambers of a ram providing power assistance to assist said maneuver; a by-pass valve communicating between the pump outlet and a fluid reservoir and which is responsive to vehicle speed so that the by-pass valve is controlled to increasingly open communication between the pump outlet and the reservoir as vehicle speed increases and to decrease said communication as vehicle speed decreases; the power assistance valve comprising valve members relative displacement between which from the neutral condition and in response to a steering input torque directs hydraulic fluid to actuate the ram for power assistance, said valve members in the neutral condition providing inter-communication between the pump, the chambers and the reservoir; said valve members being biased to the neutral condition by biasing means; wherein a flow sensitive valve is provided in the line connecting the pump to the reservoir by way of the by-pass valve whereby the flow sensitive valve acts to reduce the flow of fluid through the by-pass valve when the flow of fluid reaches a predetermined maximum flow.

Preferably the flow sensitive valve comprises a cylinder having an inlet port for admission of fluid and an outlet port for output of fluid, a piston having a surface acted upon by the flow of fluid through the valve and variably movable between a first position in which the inlet port is directly connected to the outlet port and a second position in which it closes the connection between the inlet port and the outlet port and biasing means for biasing the piston to its first position, the arrangement being such that when the flow of fluid reaches a predetermined maximum, the force of the fluid flow acting on the surface of the piston overcomes the force of the biasing means and moves the piston towards its second position, thus reducing the flow of fluid through the flow sensitive valve.

The piston may be hollow and the surface of the piston acted on by the fluid flow may have an orifice therein such that a fluid pathway is formed between the inlet and outlet ports through the piston. The hollow piston may be open at the downstream end and the orifice in the surface of the piston acted upon by the fluid flow may be of smaller diameter than the open end of the piston. The biasing means may comprise a spring acting between an interior surface of the piston and a surface arranged at one end of the cylinder.

The said surface arranged at one end of the cylinder may comprise a spring biased plunger, the head of which is of larger diameter than the interior diameter of the piston. The plunger may be carried by a stem passing through the end wall of the cylinder into a chamber in which is located a spring acting on the plunger. To this end, the plunger may be provided with a second head located in the chamber and against which the plunger spring for biasing the plunger acts while the end of the chamber away from the plunger head may be closed by a closure element against which the plunger spring acts.

The flow sensing valve remains open during normal maneuvering and only comes into play during severe steering maneuvers at high speed. It will serve to prevent the build up of large fluid flows which would otherwise occur causing sudden elimination of the power assistance.

DRAWINGS

One embodiment of a vehicle power assisted steering system constructed in accordance with the present invention will now be described, by way of example only, with reference to the accompanying illustrative drawings in which:

FIG. 4 is a longitudinal view, partly in section, of the flow sensitive valve of FIG. 3 attached to a typical by-pass valve.

DETAILED DESCRIPTION OF THE DRAWINGS

Figure 1:
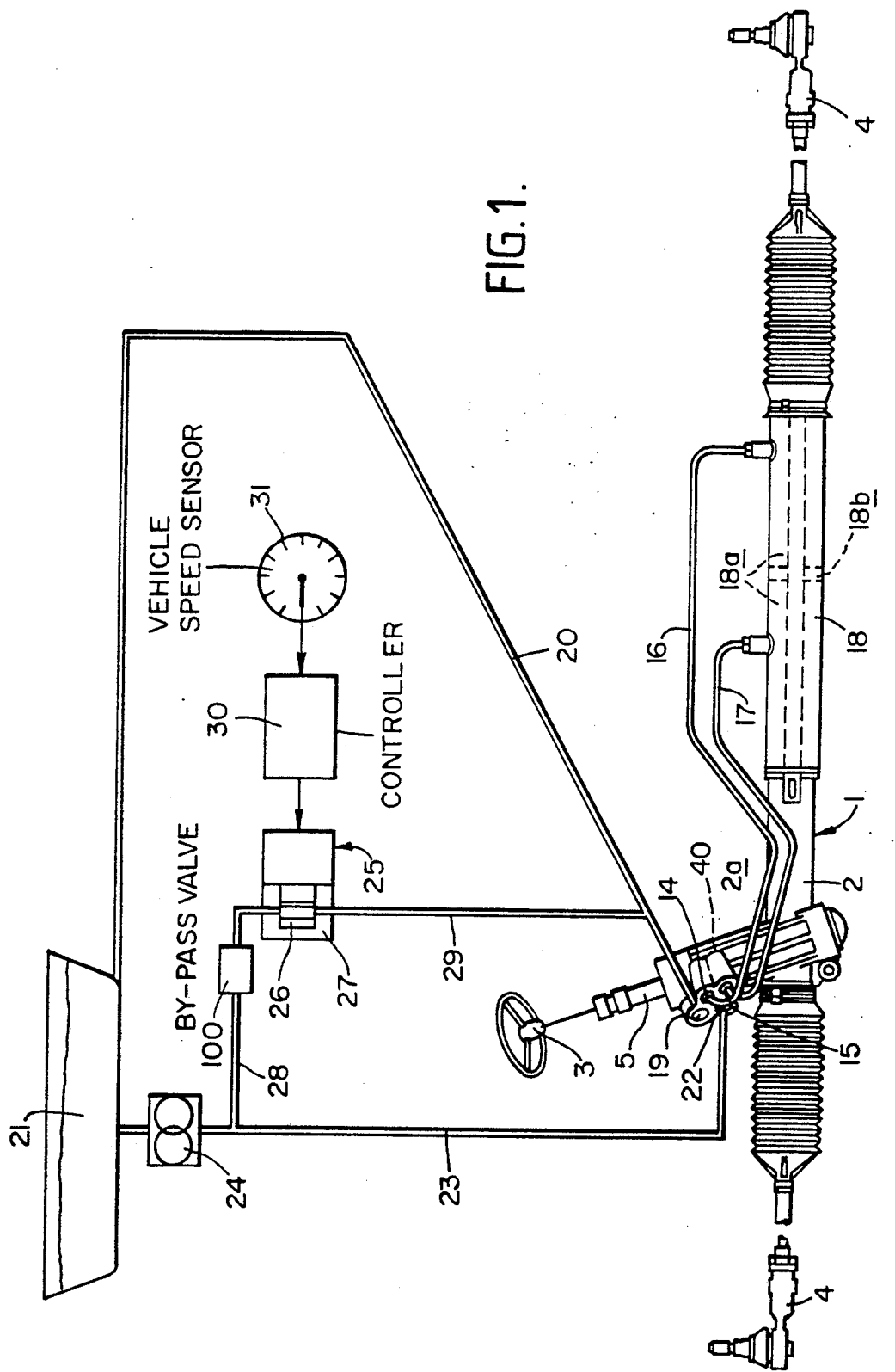
FIG. 1 is a diagrammatic illustration of the system.
Figure 2:
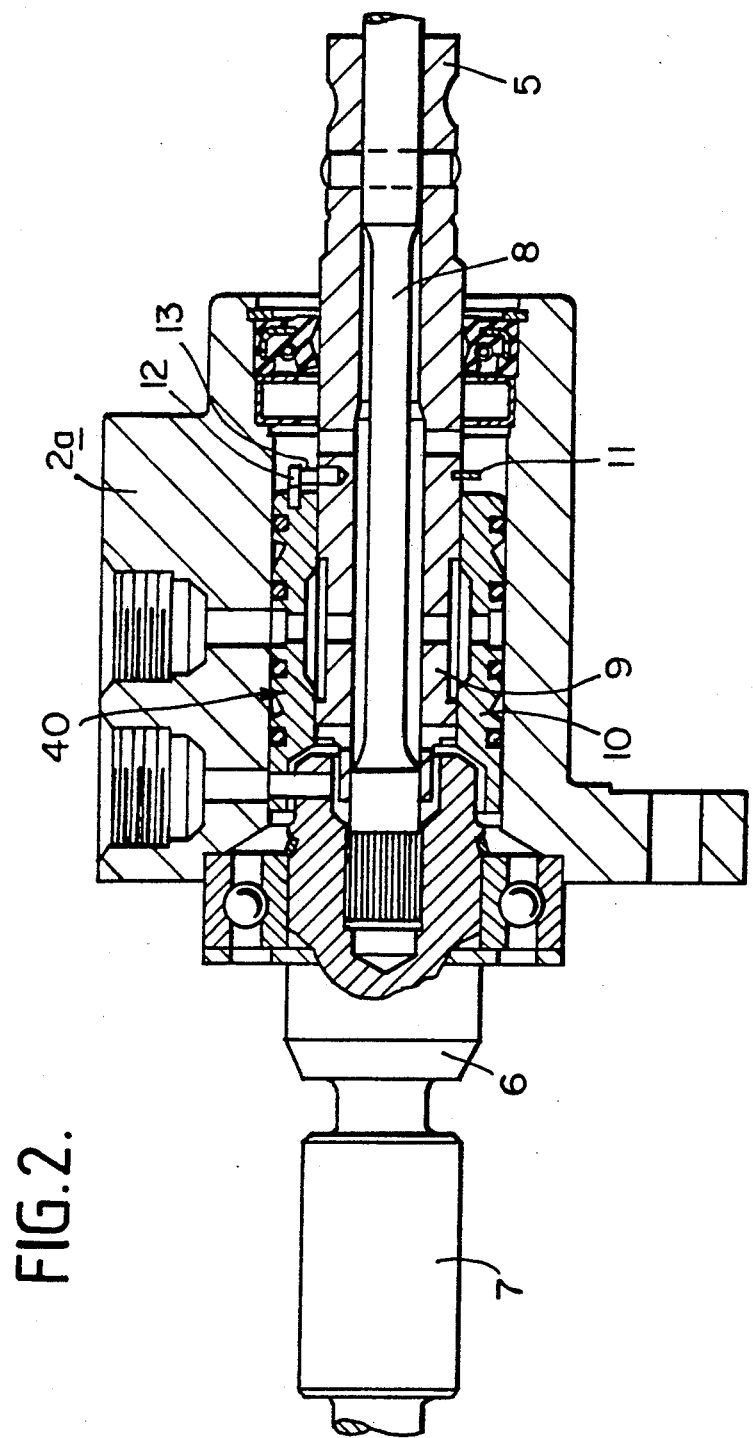
FIG. 2 is a longitudinal section through a typical open center power assistance valve incorporated in the system.

The power assisted steering system shown in FIG. 1 includes a conventional rack and pinion, ram assisted type steering gear 1, the essential components, structure and basic operation of which will be well known to those familiar with the present art. More particularly, the gear 1 has a rack bar which is longitudinally displaceable in a housing 2. Within an extension 2a of the housing is rotatably mounted a pinion 7 which engages with the rack teeth so that rotation of the pinion by the steering wheel 3 and in response to a steering input torque displaces the rack bar longitudinally to effect a steering maneuver through conventional steering linkages 4. Within the housing extension 2a is provided a rotary type open center power assistance valve 40 (as shown in FIG. 2), the structure and operation of which is fully discussed in our British Patent Specification No. 2,165,502. Basically however the power assistance valve has a steering input shaft 5 coupled to the steering wheel 3. The shaft 5 is co-axially coupled to a shaft 6 of the pinion 7 through a torsion bar 8 so that the shafts 5 and 6 are capable of restricted rotation relative to each other. The input shaft 5 includes a valve rotor 9 which is received within a valve sleeve 10 rotatable within the shaft 6. The torsion bar 8 rotationally biases the valve members 9 and 10 relative to each other and to a neutral condition of the open centre valve. Mounted on the input shaft 5 is a C-shaped spring 11, the mouth of which reacts between pegs 12 and 13 on the valve sleeve 10 and valve rotor 9 respectively so that when the valve rotor and valve sleeve are displaced from their neutral condition, the mouth of the C-shaped spring 11 opens and the reaction of the spring provides a biasing force additional to that of the torsion bar 8, to restore the rotary valve to its neutral condition. The biasing force provided by the torsion bar tends to predominate for relatively large angular displacements between the valve rotor and sleeve from the neutral condition while the biasing force provided by the C-spring 11 tends to predominate for relatively small angular displacement between the valve rotor and sleeve from the neutral condition (so that the latter ensures a positive centering of the valve in its neutral condition and, predominantly, the C-spring 11 is preloaded so that it is this preload which has to be overcome before the rotary valve can be displaced from its neutral condition). The open center valve operates in conventional manner and, as can be seen from FIG. 1, has outlet ports 14 and 15 which communicate through conduits 16 and 17 respectively with opposed chambers 18a of a double acting power assistance ram 18b mounted within a ram chamber section 18 of the rack bar housing. The ram 18b is coupled to the rack bar in known manner so that its actuation will assist in longitudinal displacement of the rack bar. The open center valve also has an exhaust port 19 which communicates by way of a conduit 20 with a hydraulic fluid reservoir 21 and an inlet port 22 which communicates by way of a conduit 23 with the outlet of a constant volume output pump 24 which draws hydraulic fluid from the reservoir 21.

In its open center neutral condition, the power assistance valve 40 provides inter-communication between the output from the pump 24, the two opposed chambers 18a of the power assistance ram and the reservoir 21 so that the system is of the open center/open return type and hydraulic fluid can circulate freely from the pump to the reservoir and between the chambers 18a. When a steering input torque is applied to the steering wheel 3 during a steering maneuver and which is adequate to rotationally displace the valve rotor 9 relative to the valve sleeve 10 against the pre-load provided by the biasing spring 11 (and to a lesser extent by the torsion bar 8) so that the power assistance valve is displaced from its neutral condition, fluid flow is directed from the pump output to one (expanding) chamber 18a of the power assistance ram while that chamber of the ram is closed to communication with the reservoir 21 and the other (contracting) chamber 18a of the ram maintains its communication with the reservoir 21 but is closed to communication with the expanding chamber of the ram. Accordingly the ram is displaced by fluid pressure in its expanding chamber to assist in longitudinal displacement of the rack bar in a direction consistent with that intended by rotation of the steering wheel 3. For standard power steering which is not varied in proportion to vehicle speed, the power assistance which is provided will, substantially, be constant for any steering maneuver irrespective of vehicle speed an when the steering input torque which is applied is sufficient to displace the open center valve from its neutral condition.

Figure 3:
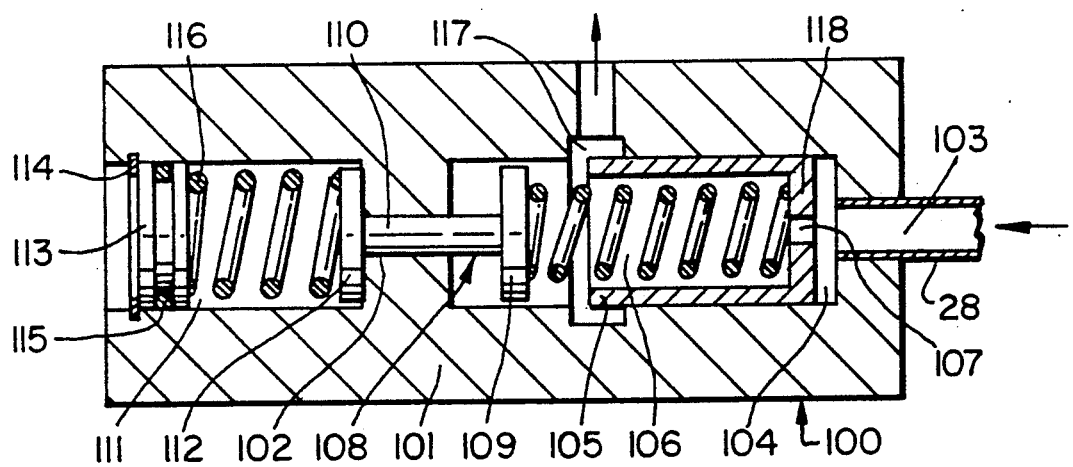
FIG. 3 is a longitudinal section through a flow sensitive valve incorporated in the system of FIG. 1.

For the speed proportional steering system of the present invention a by-pass valve 25 is provided which opens and closes communication between the pump output 24 and the reservoir 21, conveniently being connected in parallel with the open center power assistance valve 40. The by-pass valve is a simple spool valve comprising a spool 26 which is axially displaceable in a spool housing 27 to control communication between a conduit 28 from the output of the pump 24 and a conduit 29 which communicates with the conduit 20 and therethrough with the reservoir 21. The spool 26 is axially adjusted by a controller 30 and in response to variations in vehicle speed from a vehicle speed sensor indicated at 31. The controller 30 and sensor 31 may be of a mechanical, electrical/electronic or fluid pressure operated kind as is well known in the art, a typical example of which is the centrifugal type controller which is fully discussed in our British Patent No. 1,293,192. The spool 26 is adjusted axially by the controller and in response to variations in vehicle speed from a condition when the vehicle is stationary where the conduit 28 is closed to communication with the conduit 29 as shown in FIGS. 1 and 3 to a condition when the vehicle is travelling at high speed (say in excess of 96 kph) where the conduit 28 is fully open to communication with the conduit 29. It will be appreciated that the spool 26 may be displaced progressively between the aforementioned conditions while the opening and closing of communication between the conduits 28 and 29 (and thereby the proportion of fluid flow from the pump 24 direct to the reservoir 21 which is permitted by way of the bypass valve) will be determined by appropriate porting of the valve 25 to provide required characteristics for variations in the fluid pressure differential which is developed across the open center valve 40 between the conduits 23 and 20 as compared with the vehicle speed. When the vehicle is stationary or moving slowly, say at a speed less than 10 kph, the bypass valve closes communication between the conduits 28 and 29 and the full pressure flow from the pump 24 is available to actuate the power assistance ram and provide maximum power assistance when the open center valve 40 is displaced from its neutral condition. As vehicle speed increases and the by-pass valve 25 progressively opens communication between the conduits 28 and 29, a reducing fluid pressure differential from the pump 24 is available to actuate the power assistance ram 18b so that the power assistance which is provided progressively decreases (and thereby a progressively greater input torque has to be applied to the steering wheel 3 to effect a steering maneuver) and the system approaches the characteristics which would substantially correspond to those of a wholly manual system.

The by-pass valve 25 may be such that when the vehicle is at high speed and maximum communication is provided between the conduits 28 and 29, a negligible or zero fluid pressure differential is available from the pump 24 to actuate the power assistance ram and maximum input torque has to be applied to the steering wheel 3 to effect a steering maneuver without power assistance (so the system may provide wholly manual steering characteristics). In this latter condition and when the open center valve is displaced from its neutral condition. The opposed chambers 18a of the ram do not inter-communicate directly through the open center valve 40 while one of those chambers communicates with the conduit 23 and the other communicates with the conduit 20. As a consequence of this arrangement and where there is no, or negligible, fluid pressure differential provided by the pump 24 across the open center valve between the conduits 23 and 20, it will be apparent that during a steering maneuver and in the absence of power assistance when the open center valve is displaced from its neutral condition, the power assistance ram 18b is displaced manually upon rotation of the shaft 5 and thereby the expanding pressure chamber 18a of the ram may be subject to cavitation to draw in hydraulic fluid from the conduit 23. This cavitational effect on the ram may result in adverse steering characteristics or feel to the driver. One proposal for overcoming this problem is the subject of our copending British Patent Application No. 8,806,387.

At the same time, a problem may arise if the system is required to have a pronounced reduction in the power assistance as the vehicle speed increases. The system described so far is satisfactory for normal high speed steering maneuvers such as are required for negotiating shallow curves during high speed motorway driving. However, there are occasions, usually in an emergency, when severe steering maneuvers may be required at high speed, for example, to swerve to avoid an accident. In these circumstances, the power assistance open center valve will be operated to provide steering assistance and this will result in the system pressure rising abnormally. Because the by-pass valve is fully open at these high vehicle speeds, the high pressure which is demanded by the system will cause large oil flows to be bypassed with the consequence that all power assistance is effectively and suddenly eliminated, leaving the high speed steering maneuver to be carried out under totally manual conditions. This situation is not acceptable.

The present invention is designed to overcome this situation. To this end, a flow sensitive valve 100 is placed in the conduit 28 leading from the pump 24 to the by-pass valve 25 as shown in FIG. 1. This valve takes the form shown in FIG. 3. It comprises a body 101 having an axial bore 102 extending therethrough. The right hand end 103 thereof (as seen in the drawings) is open, forming an inlet port, and extends inwardly to a cylinder 104 forming a cylinder containing a hollow piston 105 which is biased towards the right by means of a spring 106 located in the hollow interior of the piston 105. The piston 105 has a central orifice 107 which allows communication between the open end 103 of the axial bore 102 and the interior of the piston 105. At the other end of the cylinder 104 is located a spring urged plunger 108 comprising a head 109 which acts as a reaction surface for the spring 106 and also as an end stop for engagement with the open end of the piston 105 should this be needed. It has a stem 110 which passes through the end wall of the cylinder 104 into a second enlarged chamber 111 of the bore 102 and is connected to a second head 112. The second chamber 111 is closed at its other end by a closure member 113 retained in position by a circlip 114 and sealed to the wall of the chamber 111 by means of an "O" ring seal 115. The spring 116 for the plunger 110 acts between the head 112 of the plunger and the closure member 113.

Around the circumference of the cylinder 104, towards the left hand end thereof is an annular outlet port 117 which can be restricted or closed by the side walls of the piston 105.

With the valve 100 in the condition shown, as the vehicle speed increases, the by-pass valve 25 will begin to open and fluid will be able to flow from the pump 24 along the conduit 28 through the valve 100 to the by-pass valve 25 and thence through conduits 29 and 20 to the reservoir 21. In the valve 100 itself, the flow from the conduit 28 passes through the inlet port 103, through the piston 105 by way of the orifice 107 and thence through the outlet port 117 back into the conduit 28. The fluid flow will act on the right hand face 118 of the piston 105 but the force of this flow is not sufficient to overcome the biasing force of the spring 106. As the by-pass valve continues to open, the flow of fluid passing through the valve 100 will increase up to a normal maximum when the by-pass valve is fully open. Even with this amount of flow, the piston will remain in its rightmost position as, for normal conditions, the operation of the valve 100 is not required.

If now an abnormal steering requirement is made, for example the need to swerve at high speed to avoid an accident, the open center valve will be actuated to assist in the steering due to the relatively high torque applied to the steering wheel 3 overcoming the preload of the power assistance valve 40. The steering wheel will cause a fast movement of the ram 18b and cause the system pressure to rise abnormally due to the by-pass valve 25 being fully open at these high speeds. This demanded pressure will, in the usual system, cause undesirably high flows of fluid which will effectively suddenly eliminate all power assistance.

In the present case, however, the increase in fluid flow will increase the pressure acting on the end surface of the piston 105 of the flow sensitive valve 100 sufficiently to overcome the force of the biasing spring 106. The piston 105 will then move to the left, and, depending on the pressure acting on the piston, will reduce or close the outlet port 117 to reduce or shut off the flow through the valve 100. This, in turn, has the effect of cutting down or eliminating the flow through the by-pass valve 28 enabling the power assistance to the steering to be restored.

Once the abnormal conditions have passed, the demanded pressure and thus the fluid flow will drop, reducing the pressure on the surface of the piston 105 allowing the spring 106 to take over and move the piston 105 back to its rightmost position again.

The function of the chamber 111 together with the spring plunger 108 is to enable the plunger 108 to move at a predetermined pressure in the cylinder 105. This movement of the plunger 108 will reduce the force of the spring 106 and thus reduces the flow setting at which the valve acts as compared to the situation with only the spring 106 present. The rate of the spring 116 can be chosen so that the relationship between pressure and flow can be fixed at a predetermined value to allow full power assistance to be progressively restored to the steering system at any desired pressure value. This provides an extremely flexible system in which the increase in flow through the bypass valve 25 can be halted at a chosen level and from this point onwards can be decreased, in order to increase the power assistance to the steering in proportion to the pressure demand.

It will also be appreciated that, because of the nature of the outlet port 117 and the arrangement of the piston 105, a variable shut off of the valve 100 can be achieved so that for fluid flows greater than normal but below the intended maximum, a reduction of the flow can take place, the amount of reduction being dependent on the flow itself.

While the valve has been shown positioned in the conduit 28 in FIG. 1, it is to be understood that the valve 100 could be positioned anywhere in the bypass i.e. in either of the conduits 28 or 29. A particularly advantageous configuration is shown in FIG. 4. In this case, the valve 100 is built on to the side of the by-pass valve 25 so that the outlet port 117 feeds directly into the inlet to the by-pass valve 25. This would have the additional advantage that it would allow venting of the spool 26 of the by-pass valve 25.

I claim:

1. A vehicle power assisted steering system comprising a hydraulic pump having an outlet providing a constant volume output; an open center power assistance valve communicating with said outlet and which is adjustable from a neutral condition in response to a steering input torque during a steering maneuver to control fluid flow from said pump to assist said maneuver; a bypass valve in a fluid line communicating between said outlet and a fluid reservoir and responsive to vehicle speed to increasingly open communication between said outlet and the reservoir as vehicle speed increases and to decrease said communication between said outlet and the reservoir as vehicle speed decreases; said power assistance valve comprising valve members which are relatively displaceable from a neutral condition in response to a steering input torque to direct hydraulic fluid, said valve members in the neutral condition providing intercommunication between said outlet and the reservoir; said valve members being biased to the neutral condition by biasing means, and a flow sensitive valve in the fluid line communicating between said outlet and the reservoir which includes said bypass valve, said flow sensitive valve including means for reducing flow of fluid through said bypass valve when the flow of fluid reaches a predetermined maximum flow.

2. A system as set forth in claim 1 in which said flow sensitive valve includes a cylinder having an inlet port for admission of fluid and an outlet port for output of fluid, a piston acted upon by the flow of fluid through said flow sensitive valve and variably movable between a first position in which said inlet port is in fluid communication with said outlet port and a second position in which said piston prevents fluid communication between said inlet port and said outlet port and biasing means for biasing said piston to the first position, the force of the fluid flow of the predetermined maximum flow causing said piston to overcome the force of said biasing means and to move toward the second position to reduce the flow of fluid through said flow sensitive valve.

3. A system as set forth in claim 2 in which said piston is hollow and having a surface acted on by the fluid flow, said surface having an orifice therein such that a fluid pathway is provided between said inlet and outlet ports through said piston.

4. A system as set forth in claim 3 in which said piston having an open end at a downstream end thereof relative to the fluid flow and said orifice in said surface being of smaller diameter than said open end of said piston.

5. A system as set forth in claim 4 in which said biasing means including a spring acting between an interior surface of said piston and a surface at one end of said cylinder.

6. A system as set forth in claim 5 in which said surface at one end of the cylinder being disposed on a spring biased plunger.

7. A system as set forth in claim 6 in which a head of said plunger is of larger diameter than an interior diameter of said piston.

8. A system as set forth in claim 6 in which said plunger including a stem passing through an adjacent end wall of said cylinder into a chamber, a plunger spring acting on said plunger being located in said chamber.

9. A system as claimed in claim 8 in which said plunger including a head located in said chamber, said plunger spring being engaged with said head.

10. A system as set forth in claim 9 in which an end of said chamber remote from said cylinder being closed by a closure element against which said plunger spring is engaged.

* * * * *